United States Patent [19]
Kuhn et al.

[11] Patent Number: 4,823,641
[45] Date of Patent: Apr. 25, 1989

[54] PLANETARY-GEAR SPEED-CHANGE TRANSMISSION

[75] Inventors: Walter Kuhn; Hans Müller, both of Friedrichshafen, Fed. Rep. of Germany

[73] Assignee: Zahnradfabrik Friedrichshafen AG, Friedrichshafen, Fed. Rep. of Germany

[21] Appl. No.: 34,157
[22] PCT Filed: Apr. 19, 1986
[86] PCT No.: PCT/EP86/00236
 § 371 Date: Dec. 30, 1986
 § 102(e) Date: Dec. 30, 1986
[87] PCT Pub. No.: WO86/06808
 PCT Pub. Date: Nov. 20, 1986

[30] Foreign Application Priority Data
May 4, 1985 [LU] Luxembourg .................... 00200

[51] Int. Cl.$^4$ .................... F16H 57/10; F16H 3/44
[52] U.S. Cl. .................... 74/760; 74/753
[58] Field of Search ........... 74/762, 760, 761, 753, 74/750 R, 751, 768, 730

[56] References Cited

U.S. PATENT DOCUMENTS

| | | | |
|---|---|---|---|
| 3,030,824 | 4/1962 | Moore | 74/761 |
| 3,088,339 | 5/1963 | Black | 74/761 |
| 3,209,618 | 10/1965 | Schwab | 74/688 |
| 3,355,966 | 12/1967 | Boehm | 74/761 |
| 3,365,985 | 1/1968 | Johnson | 74/761 |
| 3,722,323 | 3/1973 | Welch | 74/761 X |
| 4,089,238 | 5/1978 | Forster et al. | 74/761 X |
| 4,143,562 | 3/1979 | Murakami | 74/753 |
| 4,229,996 | 10/1980 | Hildebrand | 74/761 X |
| 4,417,484 | 11/1983 | Gaus et al. | 74/761 X |

FOREIGN PATENT DOCUMENTS

2131483 12/1971 Fed. Rep. of Germany.

OTHER PUBLICATIONS

Automatic Transmission for Passenger Coaches by R. H. Schaefer and D. L. Robinson, ASE, Detroit, Mich., Feb. 24–28, 1975, No. 750381 (Society of Automotive Engineers, Inc.).

Primary Examiner—Leslie A. Braun
Assistant Examiner—David Novais
Attorney, Agent, or Firm—Herbert Dubno

[57] ABSTRACT

A planetary gear transmission having four or five forward speeds and which comprises three planetary gear sets with clutches and brakes for speed selection. The planet carriers of the sets are connected together and positively connected to the output shaft, while the planet gearing for the first two gear sets utilizes a planet gear of the second gear set which extends axially over both the first and second gear sets and meshes with the internal and sun gears of the second gear set, and a planet gear on the common planet carrier which meshes only with the internal gear of the first gear set and with the planet gear of the second gear set.

6 Claims, 4 Drawing Sheets

| | A | B | C | D | E | F | i | φ |
|---|---|---|---|---|---|---|---|---|
| R.G. | | X | | | X | | 4.97 | |
| N | X | | | | | | | |
| 1 G. | X | | | | X | | 3.35 | 1.60 |
| 2 G. | X | | | X | | | 2.09 | 1.50 |
| 3 G. | X | | X | | | | 1.39 | 1.39 |
| 4 G. | X | X | | | | | 1.0 | 1.33 |
| 5 G. | X | | | | | X | 0.751 | |

| | A | B | C | D | G | i | φ |
|---|---|---|---|---|---|---|---|
| R G. | | X | | X | | −1.77 | |
| N | X | | | | | | |
| 1 G. | X | | | X | | 2.09 | 1.5 |
| 2 G. | X | | X | | | 1.39 | 1.39 |
| 3 G. | X | X | | | | 1.0 | 1.33 |
| 4 G. | X | | | | X | 0.75 | |

PLANETARY-GEAR SPEED-CHANGE TRANSMISSION

CROSS REFERENCE TO RELATED APPLICATIONS

This application is a national phase application corresponding to PCT/EP/86/00236 filed Apr. 19, 1986 and based, in turn, on PCT/EP85/00200 filed May 4, 1985 under the International Convention.

FIELD OF THE INVENTION

Our present invention relates to a planetary gear transmission and, more particularly, to a four or five-speed transmission which can be of highly compact construction.

BACKGROUND OF THE INVENTION

SAE 750381, pages 4 and 12, describes a four-speed transmission which consists of a Simpson-type planetary gear set followed by a simple planet set arrayed thereafter, and which has two clutches and three brakes. A hydrodynamic unit is provided ahead of the transmission.

Transmissions of this type with a Simpson-type planetary gear set as a three-speed transmission unit have proven themselves particularly in transmissions to be shifted automatically.

However, their construction is complicated and the cost of manufacture is high. The overall length of the transmission is not satisfactory, and the positions of the clutches and brakes are not optimal with respect to the planetary sets.

OBJECTS OF THE INVENTION

It is, therefore, an object of the invention to provide an improved planetary-gear transmission, which can be manufactured more economically, facilitates more favorable speed ratios including an overdrive, is comparatively short, and can be expanded with respect to the number of speeds, particularly to a four-speed embodiment, with ease.

SUMMARY OF THE INVENTION

This object is achieved with a planetary gear speed-change transmission for a motor vehicle with positively connected partial drives and at least one hydrodynamic unit positioned at the input to the transmission, a gear ratio sequence decreasing from the highest speed and with shift couplings/clutches and brakes for the automatic shifting of at least four forward speeds. According to the invention the first two gear sets are realized in the form of a reduced/connecting drive with a compound planet set where the first planets extend over both gear sets and the second planets are arrayed only in the first gear set and mesh with a breakable internal gear and the first planets. In the second gear set there are also arrayed a sun gear and an internal gear and a common planet carrier is connected with the planet carrier of the first gear set and the third gear set forming a further speed, and can be connected with the output shaft in a positive manner.

The common planet carrier yields in connection with a further gear set a particularly favorable sequence of speeds and the fixed connection of the transmission output shaft with the two planet carriers permits a simple and short transmission construction. Interconnecting gear for the connection of the planet carriers with one another and with the output shaft is not necessary, and only one bearing is needed for the output shaft.

According to a feature of the invention, the third gear set is a simple planet set with a sun gear, an internal gear and a simple planet. Alternatively, the third gear set is formed by a stepped planet set with a compound planet and two sun gears. When a step planet is provided in the gear train, in addition to the favorable sequence of speeds, an overdrive as is frequently desired, can be provided. In this embodiment, the fixed connection of the two planet carriers to the output shaft can also be retained, so that the advantages previously described will result. This allows an overdrive construction with the favorable ratio of 0.75 and only one shafting element without essential modification of the basic four-speed transmission.

The direct-drive construction wherein the third gear set is a simple planet set, is particularly suited for an expansion to a five-speed transmission, where the fifth speed is an overdrive. The advantages of the five-speed construction reside particularly in the straightforward construction. Thus the internal gear of the third gear set can be lengthened, retaining the number of teeth, and utilized for the planets of the fourth gear set, while fourth gear set has the same radius as the third gear set, so that the torque is transferred to the sun gear of the fourth fear set, bypassing the planet carrier. Furthermore no splitting of the output shaft is necessary, which is of particular advantage when this shaft has large dimensions.

The construction of the drive of the two variants of the four-speed solution and also of the five speed solution makes it possible to form the initial clutch in a simple manner as a jaw coupling, without thereby impairing the capability of shifting under load in the forward speeds or from neutral into the forward speeds. Furthermore, an axial balancing of the transmission shaft is not necessary because the spring for the engagement of this coupling helps to produce the pressure force for the axial bearing. And lastly it is possible to journal the planets of the fourth gear set in a cantilever by extending the planet axle of the third gear set, which contributes to simplification in manufacture and assembly.

It is possible to arrange the clutches and the brake in a plane perpendicular to the transmission axis in particularly advantageous manner, which contributes to a further shortening of the transmission. The available radial construction space permits this embodiment because the first clutch can be realized as a jaw clutch.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figures 1, 2:
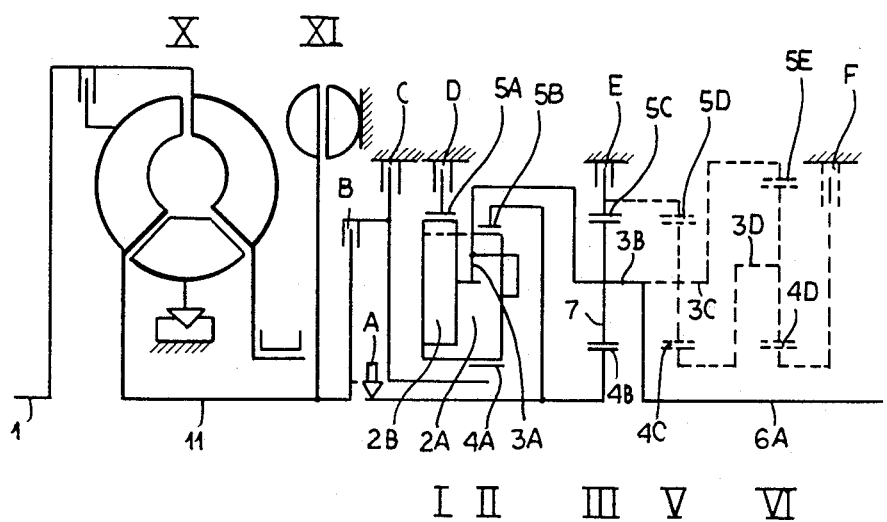
FIG. 1 is a gear diagram for a four-speed direct drive with a fifth speed overdrive transmission according to the invention.
FIG. 2 is a table showing the ratios and engaged clutches, couplings and brakes for the speeds of the transmission of FIG. 1.

In FIG. 1, the four-speed transmission with direct drive in its highest speed and the gear sets I, II, III is shown in solid lines. The input shaft 1 is connected to the impeller of the hydrodynamic torque converter X. The turbine shaft 11 of the torque converter X is connected to couplings or clutches A and B. Coupling A is engaged in all of the forward speeds and in neutral, while clutch B is activated only in reverse and for force distribution in fourth speed. Additionally, a hydrodynamic brake or retarder XI is connected to turbine shaft 11. In the region of the first gear set I and the second gear set II a compound planet set is provided, and the third gear set III is formed by a single planet gear set. The brakes C, D, and E from part of the four-speed basic transmission of the first three gear sets.

The coupling A is connected with the rotor shaft of clutch/coupling B and the internal gear 5B of the second gear set II and the sun gear 4B in the third gear set III.

The brake C is connected with the clutch /coupling B and the sun gear 4A in the second gear set II.

The brake D is connected with the internal gear 5A in the first gear set I.

The brake E is connected with the internal gear 5C in the third gear set III.

The common planet carrier 3A of the first and second gear sets I and II is connected with the planet carrier 3B of the third gear set III and the output shaft 6A. The planet unit in the gear sets I and II has dual planets 2A, 2B, where the planet wheels 2A extend over both gear sets and mesh with internal gear 5B, which is connected with clutch A, and with sun gear 4A, which is connected to clutch/coupling B. The planet gears 2B mesh with the internal gear 5A, which is connected with brake D and with planet gears 2A. The fifth speed section of the transmission is shown in FIG. 1 is dashed lines. Gear sets V and VI have the following connections:

Internal gear 5D of the fourth gear set V is connected with the internal gear 5C of the third gear set III.

The planet carrier 3C of the fourth gear set V with the planet carrier 3B of the third gear set III and the internal gear 5E of the fifth gear set VI.

THe sun gear 4C of the fourth gear set is connected with the planet carrier 3D of the fifth gear set VI.

THe sun gear 4D is connected with the brake F.

The planet carriers 3B and 3C as well as the internal gears 5C and 5D can be provided in a one-piece construction.

In FIG. 2, those clutches/couplings and brakes which engaged for the several speeds reverse (R.G.) neutral (N), first speed (1 G.), second speed (2 G.), third speed (3 G.), fourth speed (4 G.) and fifth speed (5 G.) are evident in simple manner. As can be deduced from column i. the gear for the speeds are particularly favorable, because not only the ratios themselves are favorable, but also because the ratios between speeds, as shown in column 4 satisfy practical requirements to a high degree.

Figures 3, 4:
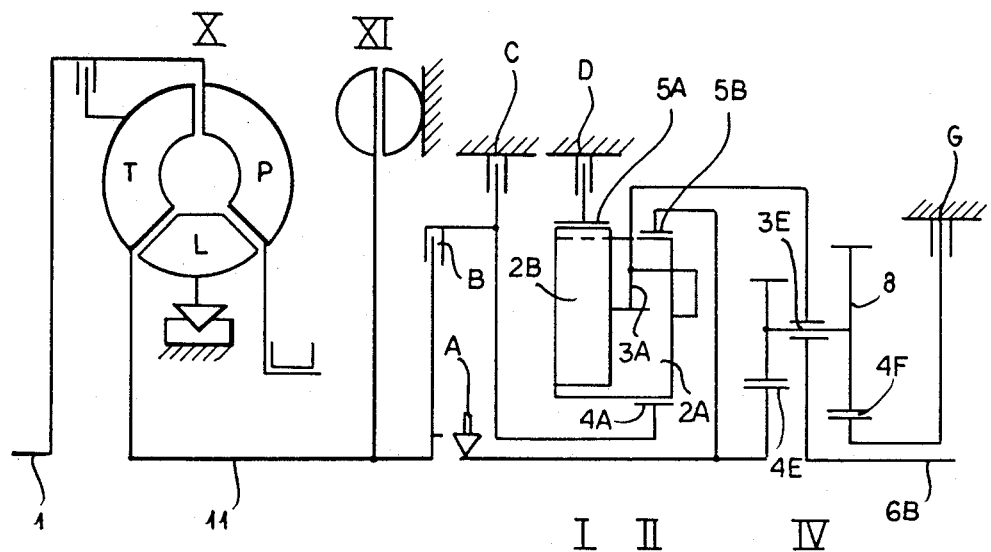
FIG. 3 is a gear diagram of the overdrive transmission with four speeds.
FIG. 4 is a table showing the ratios and engaged clutches, couplings and brakes for the transmission according to FIG. 3.

A four-speed transmission with overdrive is shown in FIG. 3. This transmission corresponds to the four-speed section shown in FIG. 1, except for the third gear set IV, in which in lieu of a simple gear set a stepped planet wheel 8 is provided. The planet 8 has one set of teeth meshing with sun gear 4E, which is positively connected to coupling A like sun gear 4B, while another set of teeth meshes with sun gear 4F, which is simultaneously connected positively to brake G (by analogy with sun gear 4D).

Figure 5:
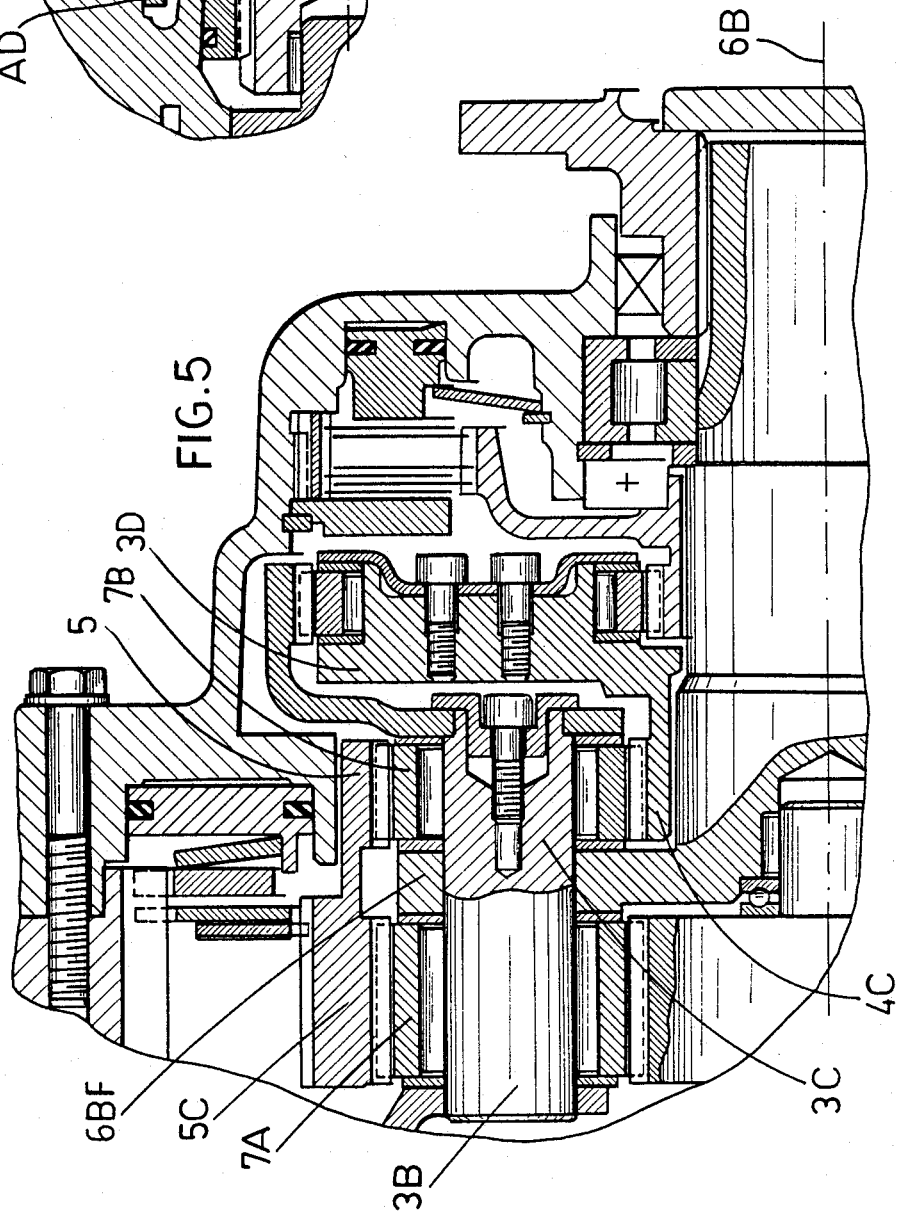
FIG. 5 is a partial section of a portion of the transmission of FIGS. 1 and 3.

Analogously to FIG. 2, FIG. 4 shows the couplings/clutches and brakes engaged for each speed as well as the speed ratios and ratios between speeds. Engaged clutches or brakes are represented by an x. As can be seen from FIG. 5, the internal gear 5C of the third set III is fixedly connected to the internal gear 5D of the fourth gear set V, and both internal gears have the same number of teeth. The planet carrier 3B and 3C is in one piece and carries the planet gears 7A and 7B. The flange 6BF of the output shaft 6B is fastened between these two planet gears and the sun gear 4C is integral with the planet carrier 3D.

Figure 6:
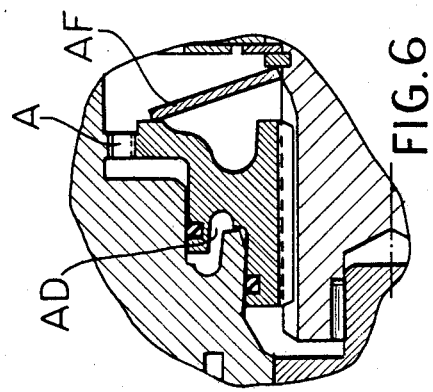
FIG. 6 is a partial section showing the first coupling.

FIG. 6 shows the positive coupling A, which in neutral position and all forward speeds is engaged, and is disengaged only in reverse via pressure means, i.e. fluid pressure fed to the space AD. The engaged position is maintained by means of a spring AF.

Figure 7:
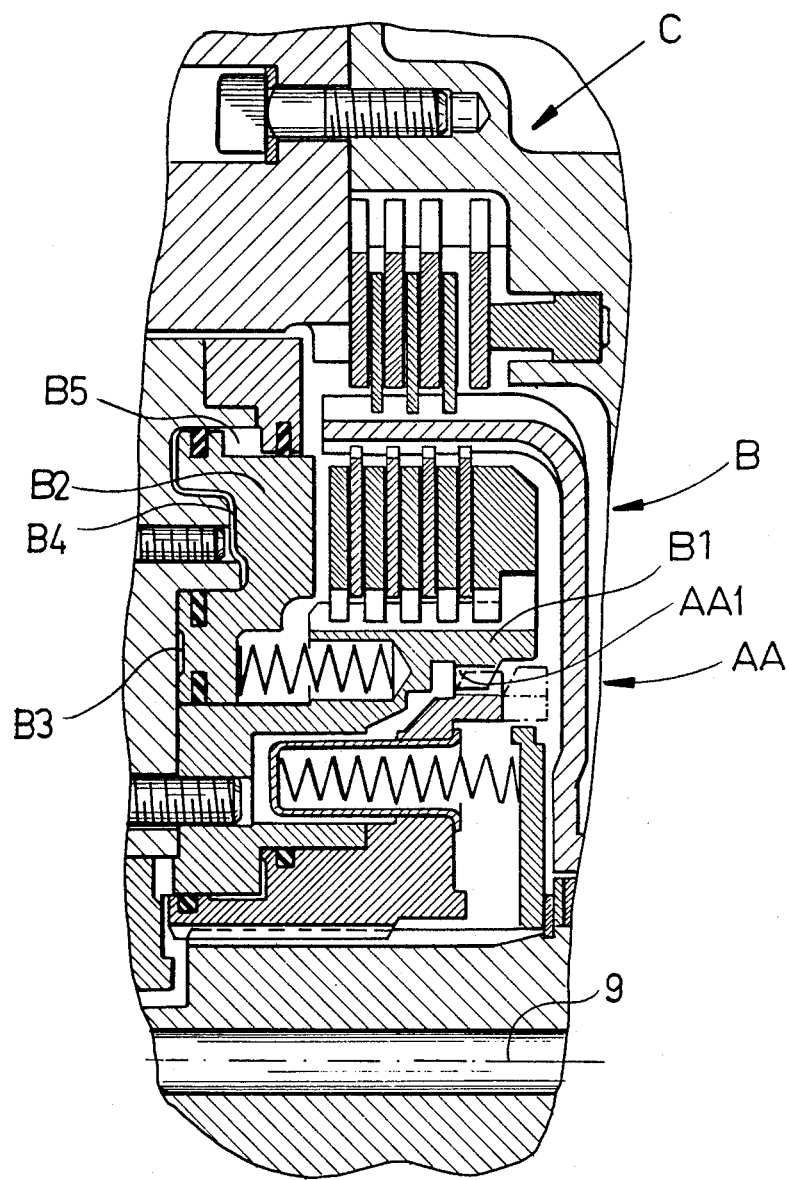
FIG. 7 is a partial section illustrating a coplanar layout of clutches and a brake for these transmission.

FIG. 7 shows the arrangement of clutches/couplings AA and B as well as brake C in a plane lying perpendicular to the transmission axis 9, where the jaw coupling AA (corresponding to coupling A) is disposed radially inwards, and the inner disk carrier B1 of clutch B simultaneously carries the outer jaws AA1 of jaw coupling AA. Clutch B, which is disposed in the radial direction between the brake C and the jaw clutch AA, has a pressure piston B2, which is acted upon alternately via two pressure volumes B3, B4 (e.g. B3 in reverse, B4 in fourth speed). At the same time there is in connection with pressure piston B2 a pressure equalization volume B5, which counteracts a possible pressure increase in the pressure volumes due to the centrifugal forces which may occur. Hence a movement in the direction of engaged position of clutch B or into the actual engaged position is prevented.

I claim:

1. A planetary gear transmission for a motor vehicle, comprising:
   an input shaft;
   a hydrodynamic unit connected to said input shaft and having an output element;
   a fist planetary gear set having
      an internal gear lying only in said first planetary gear set, and
      a planet gear meshing with said internal gear;
   a second planetary gear set forming a reducing drive with said first planetary gear set and having
      an internal gear,
      a planet gear extending over both said first and second planetary gear sets and meshing with said internal gear of said second planetary gear set and with said first planetary gear,
      a sun gear meshing with said planet gear of said second planetary gear set, and
      means forming a common planet carrier carrying both of said planet gears;
   a third planetary gear set having
      a sun gear connected with the internal gear of said second planetary gear set, a planet gear meshing with said sun gear of said third planetary gear set, and a planet carrier positively connected to said common planet carrier and carrying said planet gear of said third planetary gear set;

an output shaft positively connected to said common planet carrier;

speed selection means including respective clutches for connecting said output element of said hydrodynamic unit to said sun gear and to said internal gear of said second planetary gear set, and respective brakes for braking said sun gear of said second planetary gear set and said internal gear of said first planetary gear set wherein said third planetary gear set has an internal gear meshing with the planet gear of said third planetary gear set, and said speed selection means includes another brake connected to brake said internal gear of said third planetary gear set, a fourth planetary gear set having
an internal gear connected to the internal gear of said third planetary gear set,
a planet gear meshing with the internal gear of said fourth planetary gear set,
a planet carrier carrying said planet gear of said fourth planetary gear set,
means connecting the planet carrier of said fourth planetary gear set with said common planet carrier, and
sun gear meshing with said planet gear of said fourth planetary gear set;

a fifth planetary gear set having
a planet carrier connected to the sun gear of said fourth planetary gear set,
an internal gear connected to the planet carrier of said fourth planetary gear set,
a planet gear meshing with said internal gear of said fifth planetary gear set and carried by the planet carrier of said fifth planetary gear set, and
a sun gear meshing with the planet gear of said fifth planetary gear set; and a further brake connected for selectively braking said sun gear of said fifth planetary gear set.

2. The planetary gear transmission defined in claim 1 wherein said third planetary gear set is a compound planetary gear set having a further sun gear, the planet of said third planetary gear set meshing with said further sun gear, said speed selection means including another brake connected to brake said further sun gear.

3. The planetary gear transmission defined in claim 1 wherein said clutch for connecting said output element of said hydrodynamic unit to said internal gear of said second planetary gear set is a jaw clutch provided with a spring for maintaining the jaw clutch in an engaged position and simultaneously applying pressure to an axial bearing journaling a shaft of said transmission.

4. The planetary gear transmission defined in claim 1 wherein said output shaft is supported by a single bearing and said common planet carrier.

5. The planetary gear transmission defined in claim 1 wherein said internal gear of said third gear set and said internal gear of said fourth gear set are formed in one piece and with the same numbers of teeth, the planets of said third and fourth gear sets being journaled on the respective planet carriers on a common planet axle.

6. The planetary gear transmission defined in claim 1 wherein said clutches and said brake for braking said sun gear of said second planetary gear set are constructed and arranged so as to be coplanar.

* * * * *